United States Patent
Vacquerie et al.

(10) Patent No.: US 11,539,885 B2
(45) Date of Patent: *Dec. 27, 2022

(54) LENS COVER-BASED IMAGE CAPTURE DEVICE OPERATION

(71) Applicant: GoPro, Inc., San Mateo, CA (US)

(72) Inventors: Vincent Vacquerie, Paris (FR); César Douady, Orsay (FR)

(73) Assignee: GoPro, Inc., San Mateo, CA (US)

(*) Notice: Subject to any disclaimer, the term of this patent is extended or adjusted under 35 U.S.C. 154(b) by 59 days.

This patent is subject to a terminal disclaimer.

(21) Appl. No.: 17/239,643

(22) Filed: Apr. 25, 2021

(65) Prior Publication Data

US 2021/0250516 A1    Aug. 12, 2021

Related U.S. Application Data

(63) Continuation of application No. 16/693,706, filed on Nov. 25, 2019, now Pat. No. 10,999,504.

(51) Int. Cl.
*H04N 5/232* (2006.01)
*H04N 5/225* (2006.01)
*G03B 11/04* (2021.01)

(52) U.S. Cl.
CPC ..... *H04N 5/232411* (2018.08); *G03B 11/041* (2013.01); *H04N 5/2252* (2013.01); *H04N 5/2254* (2013.01); *H04N 5/23245* (2013.01)

(58) Field of Classification Search
CPC .. H04N 5/232411; G03B 11/041; G03B 11/04
See application file for complete search history.

(56) References Cited

U.S. PATENT DOCUMENTS

| | | | |
|---|---|---|---|
| 5,541,656 A | 7/1996 | Kare | |
| 5,666,568 A | 9/1997 | Saito | |
| 6,570,621 B2 | 5/2003 | Bigler | |
| 7,633,548 B2 | 12/2009 | Misawa | |
| 7,871,209 B1 | 1/2011 | Sampathkumaran | |
| 8,004,603 B2 * | 8/2011 | Nozaki | H04N 5/2259 348/207.99 |
| 8,009,230 B2 * | 8/2011 | Nozaki | H04N 5/2259 348/207.99 |
| 10,972,657 B1 * | 4/2021 | Mallegowda | H04N 5/23227 |
| 2001/0043279 A1 * | 11/2001 | Niikawa | H04N 5/23203 348/222.1 |
| 2002/0171756 A1 | 11/2002 | Bigler | |
| 2005/0162520 A1 * | 7/2005 | Karasaki | H04N 1/32128 348/E5.043 |

FOREIGN PATENT DOCUMENTS

| | | | |
|---|---|---|---|
| JP | 02247627 A | 10/1990 | |
| JP | 03108961 A | 5/1991 | |
| JP | 05037836 A | 2/1993 | |
| JP | 06022198 A | 1/1994 | |

(Continued)

*Primary Examiner* — John Villecco
(74) *Attorney, Agent, or Firm* — Esplin & Associates, PC

(57) ABSTRACT

An image capture device may include one or more optical elements. One or more lens covers may be used to cover the optical element(s). Usage of the lens cover(s) with respect to the optical element(s) may be determined. The operation of the image capture device may be changed based on whether the lens cover(s) are on or off the optical element(s).

20 Claims, 5 Drawing Sheets

(56) References Cited

FOREIGN PATENT DOCUMENTS

| | | | |
|---|---|---|---|
| JP | 11220684 A | | 8/1999 |
| JP | 2000152071 A | * | 5/2000 |
| JP | 2001059278 A | | 3/2001 |
| JP | 2002369057 A | | 12/2002 |
| JP | 2003066522 A | * | 3/2003 |
| JP | 2007088666 A | | 4/2007 |
| JP | 2008158058 A | | 7/2008 |
| JP | 2009027310 A | | 2/2009 |
| JP | 2010134351 A | | 6/2010 |

* cited by examiner

LENS COVER-BASED IMAGE CAPTURE DEVICE OPERATION

FIELD

This disclosure relates to changing operation of image capture device based on lens cover usage.

BACKGROUND

A user may forget to shut off an image capture device, leading the image capture device to deplete the battery. A user may forget to place lens cover on the image capture device, exposing the lens to potential damage (e.g., scratch, chip).

SUMMARY

This disclosure relates to changing image capture device operation based on lens cover usage. Lens cover usage information and/or other information may be obtained. The lens cover usage information may characterize usage of a lens cover with respect to an optical element. A state of the usage of the lens cover with respect to the optical element may be determined based on the lens cover usage information and/or other information. Operation of the image capture device may be changed based on the state of the usage of the lens cover with respect to the optical element and/or other information.

A system that changes image capture device operation based on lens cover usage may include one or more electronic storages, one or more processors, and/or other components. An electronic storage may store lens cover usage information, information relating to usage of a lens cover with respect to an optical element, information relating to states of usage of the lens cover, information relating to operation of an image capture device, information relating to changes in operation of an image capture device, and/or other information. In some implementations, the system may include one or more optical elements, one or more image sensors, one or more buttons, and/or other components.

One or more components of the system may be carried by a housing, such as a housing of an image capture device. For example, the optical element(s), the image sensor(s), and/or the button(s) of the system may be carried by a housing of an image capture device. An optical element may be configured to guide light within a field of view to an image sensor. An image sensor may be configured to generate a visual output signal conveying visual information based on light that becomes incident thereon and/or other information. The visual information may define visual content having the field of view. The housing may carry other components, such as the button(s), processor(s), and/or the electronic storage.

The processor(s) may be configured by machine-readable instructions. Executing the machine-readable instructions may cause the processor(s) to facilitate changing image capture device operation based on lens cover usage. The machine-readable instructions may include one or more computer program components. The computer program components may include one or more of a lens cover usage information component, a lens cover usage component, an operation component, and/or other computer program components.

The lens cover usage information component may be configured to obtain lens cover usage information and/or other information. The lens cover usage information may characterize usage of one or more lens covers with respect to one or more optical elements.

The lens cover usage component may be configured to determine one or more states of the usage of the lens cover(s) with respect to the optical element(s) based on the lens cover usage information and/or other information. In some implementations, a state of usage of a lens cover with respect to an optical element may be determined to be on or off. In some implementations, a state of usage of a lens cover with respect to an optical element may be determined to be on, off, or between on and off.

The operation component may be configured to change operation of the image capture device based on the state(s) of the usage of the lens cover(s) with respect to the optical element(s) and/or other information. In some implementations, the operation of the image capture device may be changed based on the state(s) of the usage of the lens cover(s) with respect to the optical element(s) such that responsive to the lens cover(s) being on the optical element(s), the image capture device is deactivated. In some implementations, the operation of the image capture device may be changed based on the state of the usage of a lens cover with respect to an optical element such that responsive to the lens cover being on the optical element, the image sensor is deactivated.

In some implementations, the operation of the image capture device may be changed based on the state(s) of the usage of the lens cover(s) with respect to the optical element(s) such that responsive to the lens cover(s) being off the optical element(s), one or more alerts to place the lens cover(s) on the optical element(s) are generated based on deactivation of the image capture device and/or other information. In some implementations, the operation of the image capture device may be changed based on the state(s) of the usage of the lens cover(s) with respect to the optical element(s) such that the lens cover(s) are required to be on the optical element(s) to deactivate the image capture device.

In some implementations, the operation of the image capture device may be changed based on the state(s) of the usage of the lens cover(s) with respect to the optical element(s) such that responsive to the lens cover(s) being on the optical element(s) during activation of the image capture device, the image capture device is returned to prior deactivated state. In some implementations, the operation of the image capture device may be changed based on the state of the usage of a lens cover with respect to an optical element such that the lens cover is required to be off the optical element to activate the image capture device.

In some implementations, the operation of the image capture device may be changed based on the state of the usage of the lens cover(s) with respect to the optical element(s) such that different user interactions with the camera required are to prompt the image capture device to perform one or more functions based on whether the lens cover(s) are on or off the optical element(s). In some implementations, the function(s) may include switching between turning on and off, and the operation of the image capture device may be changed based on the state of the usage of a lens cover with respect to an optical element such that: (I) for a turning on function: (a) responsive to the lens cover being on the optical element, a long-press of a power button is required to turn on the image capture device; (b) responsive to the lens cover being off the optical element, a short-press of a power button is required to turn on the image capture device; and (II) for a turning off function: (a) responsive to the lens cover being on the optical element, a short-press of a power button is required to turn off the image capture device; and (b) responsive to the lens cover being off the optical element, a long-press of a power button is required to turn off the image capture device.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
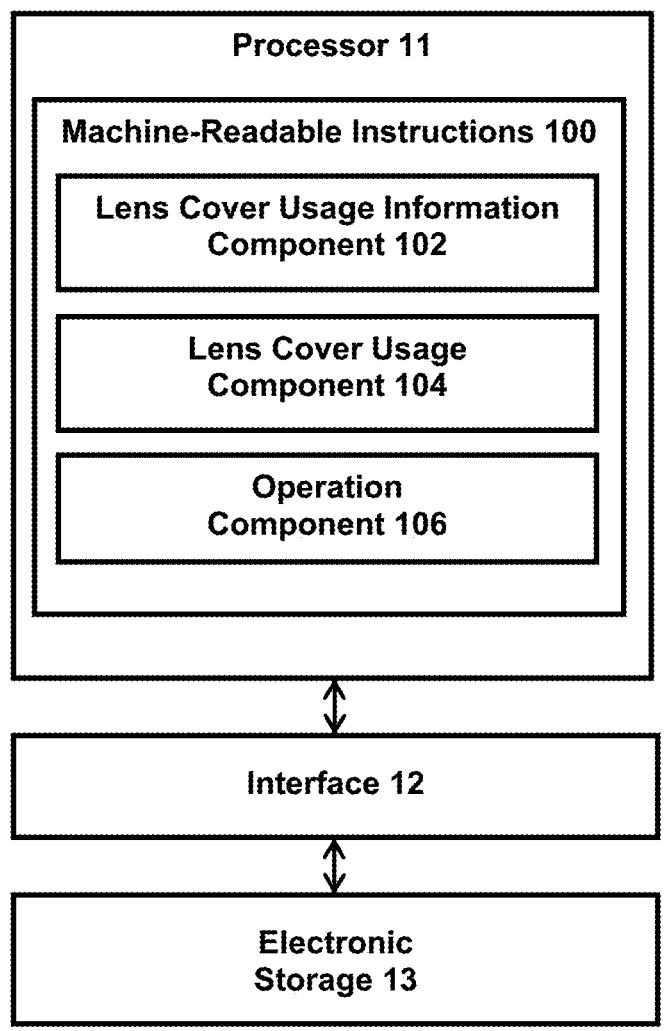
FIG. 1 illustrates an example system that changes image capture device operation based on lens cover usage.

FIG. 1 illustrates a system 10 for changing image capture device operation based on lens cover usage. The system 10 may include one or more of a processor 11, an interface 12 (e.g., bus, wireless interface), an electronic storage 13, and/or other components. In some implementations, the system 10 may include one or more optical elements, one or more image sensors, one or more buttons, and/or other components. Lens cover usage information and/or other information may be obtained by the processor 11. The lens cover usage information may characterize usage of a lens cover with respect to an optical element. A state of the usage of the lens cover with respect to the optical element may be determined by the processor 11 based on the lens cover usage information and/or other information. Operation of the image capture device may be changed by the processor 11 based on the state of the usage of the lens cover with respect to the optical element and/or other information.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store lens cover usage information, information relating to usage of a lens cover with respect to an optical element, information relating to states of usage of the lens cover, information relating to operation of an image capture device, information relating to changes in operation of an image capture device, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate changing image capture device operation based on lens cover usage. The machine-readable instructions 100 may include one or more computer program components. The machine-readable instructions 100 may include one or more of a lens cover usage information component 102, a lens cover usage component 104, an operation component 106, and/or other computer program components.

Visual content may refer to content of image(s), video frame(s), and/or video(s) that may be consumed visually. For example, visual content may be included within one or more images and/or one or more video frames of a video. A video frame may refer to one or more of an image frame, frame of pixels, encoded frame (e.g., I-frame, P-frame, B-frame), and/or other types of video frame. The video frame(s) may define the visual content of the video. That is, video may include video frame(s) that define the visual content of the video. Video frame(s) may define visual content viewable as a function of progress through the progress length of the video content. A video frame may include an image of the video content at a moment within the progress length of the video.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, optical element(s), image sensor(s), and/or button(s) of the system 10 may be carried by the housing of the image capture device. The housing may carry other components, such as the processor 11 and/or the electronic storage 13.

Figure 3:
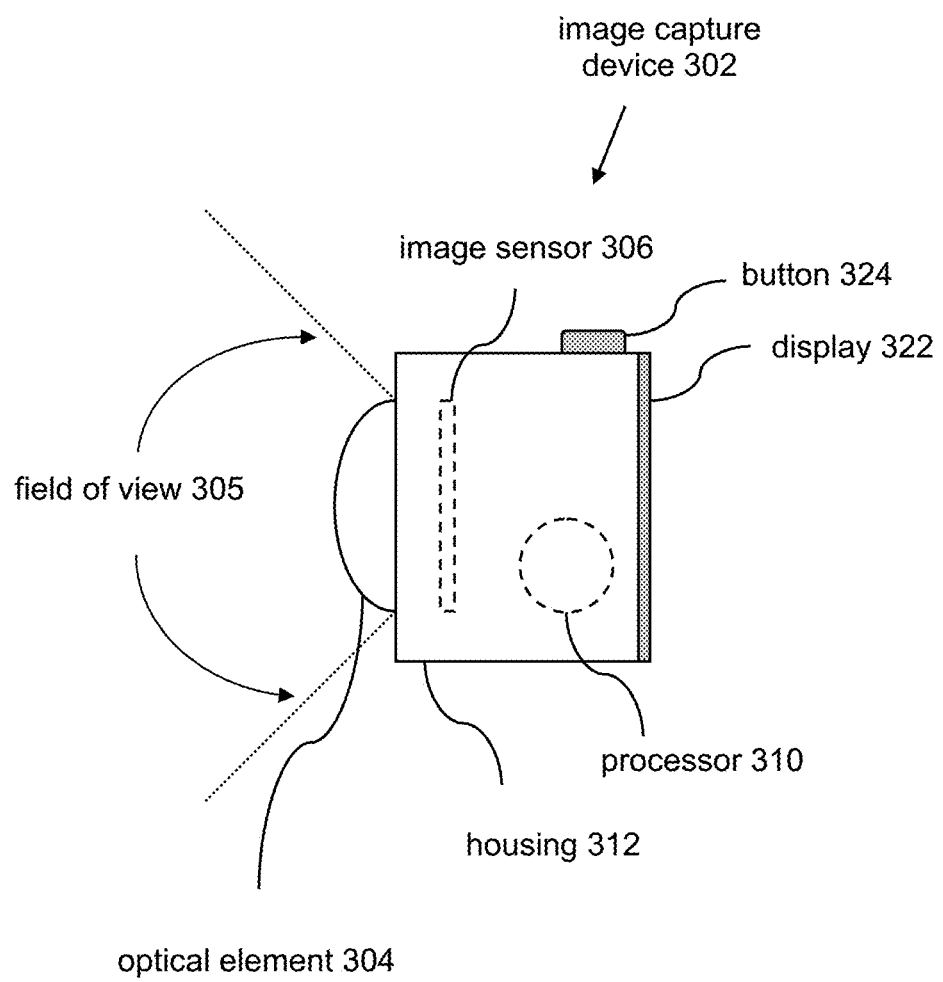
FIG. 3 illustrates an example image capture device.

An image capture device may refer to a device for recording visual information in the form of images, videos, and/or other media. An image capture device may be a standalone device (e.g., camera) or may be part of another device (e.g., part of a smartphone, tablet). FIG. 3 illustrates an example image capture device 302. The image capture device 302 may include a housing 312. The housing 312 may refer a device (e.g., casing, shell) that covers, protects, and/or supports one or more components of the image capture device 302. The housing 312 may include a single-piece housing or a multi-piece housing. The housing 312 may carry (be attached to, support, hold, and/or otherwise carry) an optical element 304, an image sensor 306, a processor 310, a display 322, a button 324, and/or other components. Other configurations of image capture devices are contemplated.

The optical element 304 may include instrument(s), tool(s), and/or medium that acts upon light passing through the instrument(s)/tool(s)/medium. For example, the optical element 304 may include one or more of lens, mirror, prism, and/or other optical elements. The optical element 304 may affect direction, deviation, and/or path of the light passing through the optical element 304. The optical element 304 may have a field of view 305. The optical element 304 may be configured to guide light within the field of view 305 to the image sensor 306.

The field of view 305 may include the field of view of a scene that is within the field of view of the optical element 304 and/or the field of view of the scene that is delivered to the image sensor 306. For example, the optical element 304 may guide light within its field of view to the image sensor 306 or may guide light within a portion of its field of view to the image sensor 306. The field of view 305 of the optical element 304 may refer to the extent of the observable world that is seen through the optical element 304. The field of view 305 of the optical element 304 may include one or more angles (e.g., vertical angle, horizontal angle, diagonal angle) at which light is received and passed on by the optical element 304 to the image sensor 306. In some implementations, the field of view 305 may be greater than or equal to 180-degrees. In some implementations, the field of view 305 may be smaller than or equal to 180-degrees.

In some implementations, the image capture device 302 may include multiple optical elements. For example, the image capture device 302 may include multiple optical elements that are arranged on the housing 312 to capture spherical images/videos (guide light within spherical field of view to one or more images sensors). For instance, the image capture device 302 may include two optical elements positioned on opposing sides of the housing 312. The fields of views of the optical elements may overlap and enable capture of spherical images and/or spherical videos.

The image sensor 306 may include sensor(s) that converts received light into output signals. The output signals may include electrical signals. For example, the image sensor 306 may include one or more of a charge-coupled device sensor, an active pixel sensor, a complementary metal-oxide semiconductor sensor, an N-type metal-oxide-semiconductor sensor, and/or other image sensors. The image sensor 306 may be configured generate output signals conveying information that defines visual content of one or more images and/or one or more video frames of a video. For example, the image sensor 306 may be configured to generate a visual output signal based on light that becomes incident thereon during a capture duration and/or other information. The visual output signal may convey visual information that defines visual content having the field of view.

In some implementations, the image capture device 302 may include multiple image sensors. For example, the image capture device 302 may include multiple image sensors carried by the housing 312 to capture spherical images/videos based on light guided thereto by multiple optical elements. For instance, the image capture device 302 may include two image sensors configured to receive light from two optical elements positioned on opposing sides of the housing 312. The fields of views of the optical elements may overlap and enable capture of spherical images and/or spherical videos.

The display 322 may refer to an electronic device for visually presenting information. The display 322 may include one or more screens. The display 322 may be used to present visual content (of images, of videos) captured by the image capture device 302. The display 322 may be used to present previews of visual content captured or to be captured by the image capture device 302. The display 312 may be used to present other visual information, such as settings for the image capture device 302 and/or messages (e.g., warnings, alerts, reminders) for the user of the image capture device 302. In some implementations, the display 322 may include a touchscreen display. A touchscreen display may be configured to receive user input via user engagement with the touchscreen display. A user may engage with the touchscreen display via interaction with one or more touch-sensitive surfaces/screens and/or other components of the touchscreen display.

The button 324 may refer to one or more mechanisms that may be physically interacted upon by a user. The button 324 may be interacted upon by a user to operate the button 324 and provide one or more commands to the image capture device 302. For example, a user may interact with the button 324 to provide one or more commands to the image capture device 302 to turn on/power on the image capture device, turn off/power off the image capture device, enter into a standby mode, exit from a standby mode, capture images, capture videos, and/or to otherwise operate the image capture device. User interaction with the button 324 may include one or more of pressing the button 324, pulling the button 324, twisting the button 324, flipping the button 324, and/or other interaction with the button 324. The button 324 may include a dedicated button with the interaction of the button 324 causing specific operation/functionality (e.g., power button, record button). The button 324 may include a multi-purpose button with the interaction of the button 324 causing different operations/functionalities (e.g., based on different context in which the image capture device 302 is operating, based on user specifying the use of the button 324).

In some implementations, the image capture device 302 may include one or more sensors to generate lens cover usage information. The lens cover usage information may characterize usage of one or more lens covers with respect to one or more optical elements of the image capture device 302. A lens cover may refer to a device that provides protection for a lens. A lens cover may provide protection from damage, such as scratches, chipping, collision, and/or other damage. A lens cover may be a single-piece device or a multi-piece device. A lens cover may be placed on an optical element via one or more attachments mechanisms. For example, a lens cover may be pushed into the housing 312, clipped onto the housing 312, engaged with the housing 312, screwed onto the housing 312, and/or otherwise used to protect the lens.

Usage of a lens cover with respect to an optical element may refer to whether and/or how the lens cover is being used with respect to the optical element. Usage of a lens cover with respect to an optical element may refer to usage of the lens cover with respect to the optical element at one or more points in time and/or one or more durations of time. Usage of a lens cover with respect to an optical element may refer to position, placement, and/or orientation of the lens cover with respect to the optical element.

The lens cover usage information may characterize usage of lens cover(s) with respect to optical element(s) by including information that describes usage of the lens cover(s) with respect to the optical element(s) and/or information that may be used to determine the usage of the lens cover(s) with respect to the optical element(s). For example, the lens cover usage information may include information that describe and/or may be used to determine whether and/or how the lens cover(s) are being used with respect to the optical element(s). Other types of lens cover usage information are contemplated.

The lens cover usage information may be generated based on operation of the sensor(s) of the image capture device 302. The sensor(s) may generate output signals that convey the lens cover usage information and/or information that may be used to determine the lens cover usage information. For example, the sensor(s) may include the image sensor 306, and the usage of a lens cover with respect to the optical element 304 may be determined based on analysis of visual content captured by the image sensor 306. For instance, visual content of image(s) and/or video(s) captured by the optical element 304 may be analyzed to determine whether and/or how the lens cover is being used with respect to the optical element. For example, if the value (e.g., maximum value) of the visual content is below a threshold corresponding to the black level and/or the noise level (e.g., recording black images/video frames), the cover may be assumed to be on the optical element 304 (e.g., determining optical element occlusion by the lens cover). In some implementations, the value of the visual content may need to be below the threshold for a point in time or over a duration of time.

As another example, the sensor(s) may include mechanical and/or electrical systems that detect whether and/or how the lens cover is being used with respect to the optical element. For instance, the lens cover may include one or more magnets, and placement of the lens on the optical element 304 may be detected by one or more Hall effect sensors carried by the housing 312. Other sensor(s) and other means of detecting usage of lens cover(s) with respect to optical element(s) are contemplated.

For example, the lens cover usage information may characterize usage of a lens cover with respect to the optical element 304. Usage of a lens cover with respect to an optical element may refer to whether and/or how the lens cover is being used with respect to the optical element. Usage of a lens cover with respect to an optical element may include usage of the lens over with respect to the optical element at one or more points in time and/or one or more durations of time. Usage of a lens cover with respect to an optical element may include the lens cover being on the lens, the lens cover being off the lens, and/or the lens cover being at a stage between being fully on and fully off the lens. For instance, the lens cover usage information may characterize whether the lens cover is on or off the optical element 304. The lens cover usage information may characterize whether the lens cover is being used so that the lens cover is between on or off (partially pushed in, partially clipped on, partially engaged with, partially screwed on).

The processor 310 may include one or more processors (logic circuitry) that provide information processing capabilities in the image capture device 302. The processor 310 may provide one or more computing functions for the image capture device 302. The processor 310 may operate/send command signals to one or more components of the image capture device 302 to operate the image capture device 302. For example, the processor 310 may facilitate operation of the image capture device 302 in capturing image(s) and/or video(s), facilitate operation of the optical element 304 (e.g., change how light is guided by the optical element 304), and/or facilitate operation of the image sensor 306 (e.g., change how the received light is converted into information that defines images/videos and/or how the images/videos are post-processed after capture).

The processor 310 may obtain information from the image sensor 306 and/or other sensor(s), and/or facilitate transfer of information from the image sensor 306 and/or other sensor(s) to another device/component. The processor 310 may be remote from the processor 11 or local to the processor 11. One or more portions of the processor 310 may be part of the processor 11 and/or one or more portions of the processor 10 may be part of the processor 310. The processor 310 may include and/or perform one or more functionalities of the processor 11 shown in FIG. 1.

For example, the processor 310 may use the lens cover usage information to determine one or more states of usage of the lens cover(s) with respect to optical element(s), and change the operation of the image capture device 302 based on the state(s) of usage of the lens cover(s) with respect to optical element(s). Such operation of the image capture device 302 may enable controlling of the image capture device 302 via different lens cover(s) usage. In some implementations, the disclosure herein may provide one or more benefits to image capture devices with wide field of view optical elements, such as an optical element having a field of view of 180 degrees or more. For such image capture devices, it may be difficult/impossible to put a flat, inexpensive, replaceable protection glass element on top of the optically active lens as such a protection glass element may restrain the accessible field of view. The lens cover(s) may be used to provide protection for such optical elements.

Referring back to FIG. 1, the processor 11 (or one or more components of the processor 11) may be configured to obtain information to facilitate changing operation of image capture device based on lens cover usage. Obtaining information may include one or more of accessing, acquiring, analyzing, determining, examining, identifying, loading, locating, opening, receiving, retrieving, reviewing, selecting, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor) and/or one or more software components (e.g., software running on a computing device).

The lens cover usage information component 102 may be configured to obtain lens cover usage information and/or other information. Obtaining lens cover usage information may include one or more of accessing, acquiring, analyzing, determining, examining, identifying, loading, locating, opening, receiving, retrieving, reviewing, selecting, storing, and/or otherwise obtaining the lens cover usage information. The lens cover usage information component 102 may obtain lens cover usage information from one or more locations. For example, the lens cover usage information component 102 may obtain lens cover usage information from a storage location, such as the electronic storage 13, electronic storage of information and/or signals generated by one or more sensors, electronic storage of a device accessible via a network, and/or other locations. The lens cover usage information component 102 may obtain lens cover usage information from one or more hardware components (e.g., an image sensor, Hall effect sensor) and/or one or more software components (e.g., software running on an image capture device). The lens cover usage information may be stored in a single file and/or across multiple files. For example, a single file may contain lens cover usage information for a single lens/optical element or for multiple lens/optical elements. Lens cover usage information for separate lens/optical element may be stored within separate files. Other storage of lens cover usage information are contemplated.

The lens cover usage component 104 may be configured to determine one or more states of the usage of the lens cover(s) with respect to the optical element(s) based on the lens cover usage information and/or other information. A state of usage of a lens cover with respect to an optical element may refer to a condition of usage of the lens cover with respect to the optical element. A statement of usage of a lens cover with respect to an optical element may be determined for one or more one or more points in time and/or one or more durations of time. Determining a state of the usage of a lens cover with respect to an optical element may include determining whether and/or how the lens cover is being used with respect to the optical element (e.g. on, off, partially on). Determining a state of the usage of a lens cover with respect to an optical element may include detecting one or more changes in states of the lens cover with respect to the optical element (e.g., on to off, off to on).

For example, a state of usage of a lens cover with respect to an optical element may be determined to be on (e.g., the lens cover is on the optical element/placed on the image capture device to cover/protect the optical element) or off (e.g., the lens cover is not on the optical element/not placed on the image capture device to cover/protect the optical element).

Figure 4A:
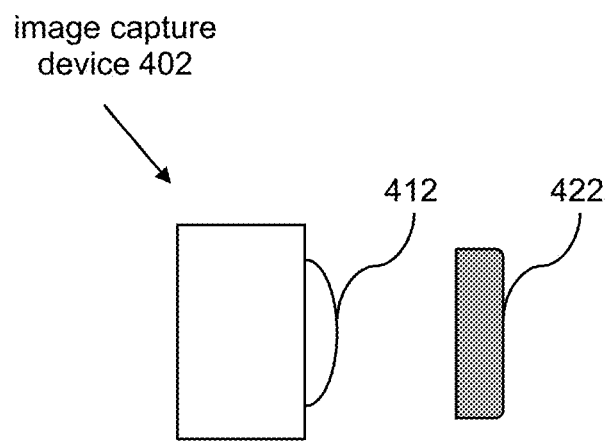
FIGS. 4A and 4B illustrate example lens cover usage for different image capture devices.
Figure 4B:
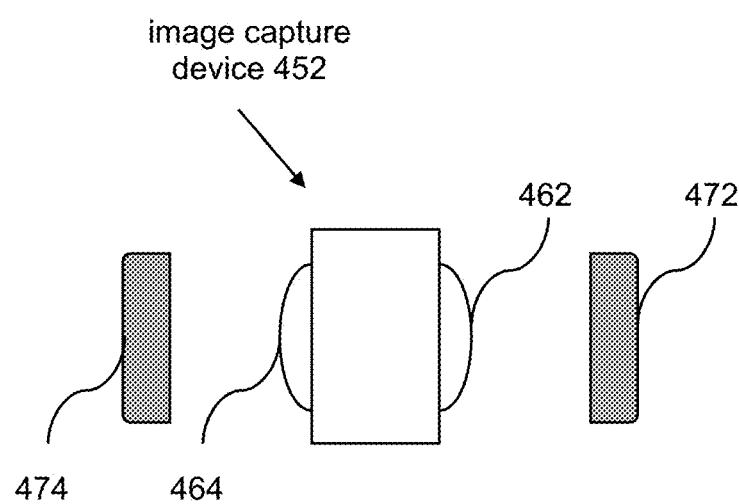

FIGS. 4A and 4B illustrate example lens cover usage for different image capture devices 402, 452. The image capture device 402 in FIG. 4A may include one optical element 412. A lens cover 422 may be configured to be used with respect to the optical element 412 to cover/protect the optical element 412. The lens cover 422 may be on the optical element 412 to cover/protect the optical element 412. The lens cover 422 may be off the optical element 412 to not cover/protect the optical element 412. The lens cover usage component 104 may be configured to determine whether the lens cover 422 is on or off the optical element 412 based on the lens cover usage information and/or other information.

The image capture device 452 in FIG. 4B may include two optical element 462, 464. A lens cover 472 may be configured to be used with respect to the optical element 462 to cover/protect the optical element 462, and a lens cover 474 may be configured to be used with respect to the optical element 464 to cover/protect the optical element 464. The lens cover usage component 104 may be configured to determine whether the lens cover 472 is on or off the optical element 462 based on the lens cover usage information and/or other information. The lens cover usage component 104 may be configured to determine whether the lens cover 474 is on or off the optical element 464 based on the lens cover usage information and/or other information.

Figure 5A:
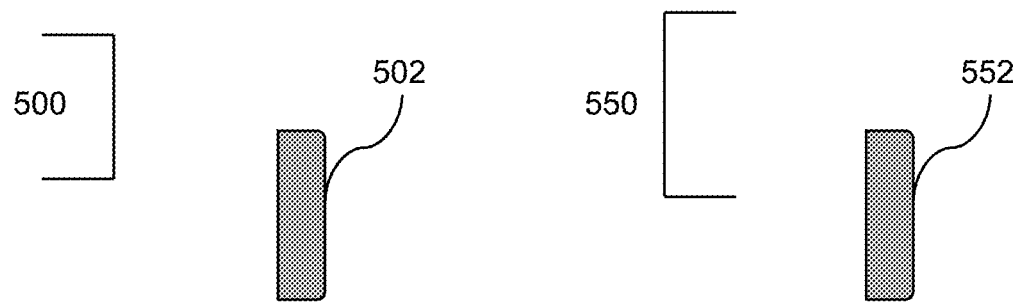
FIGS. 5A, 5B, and 5C illustrate example states of lens cover usage.
Figure 5B:
Figure 5C:

FIGS. 5A, 5B, and 5C illustrate example states of lens cover usage. The states of lens cover usage (usage of a lens cover with respect to an optical element) may include the lens cover being on the optical element, the lens cover being off the optical element, and/or the lens cover being at a stage between being fully on and fully off the optical element (a stage of being on/off). For example, in FIGS. 5A-5C, a lens cover 502 may be placed on an optical element via engagement with a protruding portion 500 of an image capture device. In FIGS. 5A-5C, a lens cover 552 may be placed on an optical element via engagement with a recessed portion 550 of an image capture device. Other engagement of the lens covers with the image capture device to cover/protect optical elements are contemplated.

In FIG. 5A, the lens cover usage component 104 may determine that the lens cover 502 is fully off the optical element based on the lens cover 502 not being engaged with the protruding portion 500. The lens cover usage component 104 may determine that the lens cover 552 is fully off the optical element based on the lens cover 552 not being engaged with the recessed portion 550.

In FIG. 5B, the lens cover usage component 104 may determine that the lens cover 502 is partially on/off the optical element based on the lens cover 502 being partially engaged with the protruding portion 500 (e.g., partially pushed on the protruding portion 500, partially clipped on the protruding portion 500, partially screwed on the protruding portion 500). The lens cover usage component 104 may determine that the lens cover 552 is partially on/off the optical element based on the lens cover 552 being partially engaged with the recessed portion 550 (e.g., partially pushed into the recessed portion 550, partially clipped into the recessed portion 550, partially screwed into the recessed portion 550).

In FIG. 5C, the lens cover usage component 104 may determine that the lens cover 502 is fully on the optical element based on the lens cover 502 being fully engaged with the protruding portion 500 (e.g., fully pushed on the protruding portion 500, fully clipped on the protruding portion 500, fully screwed on the protruding portion 500). The lens cover usage component 104 may determine that the lens cover 552 is fully on the optical element based on the lens cover 552 being fully engaged with the recessed portion 550 (e.g., fully pushed into the recessed portion 550, fully clipped into the recessed portion 550, fully screwed into the recessed portion 550).

The operation component 106 may be configured to change operation of the image capture device based on the state(s) of the usage of the lens cover(s) with respect to the optical element(s) and/or other information. The operation of the image capture device may refer to one or more ways in which the image capture device operates. The operation of the image capture device may refer to one or more methods and/or one or more manners of functioning of the image capture device. How the image capture device operates may be changed based on whether and/or how the lens cover(s) are being used with respect to the optical element(s) and/or other information. For example, the operation component 106 may change the operation of the image capture device based on whether or not a lens cover is on or off the corresponding optical element. The operation component 106 may change the operation of the image capture device based on whether or not a lens cover is fully on, fully off, or between being fully on and fully off (e.g., partially on/off) the corresponding optical element.

In some implementations, changes in the operation of the image capture device may depend on one or more user input and/or other information. For example, the user may configure the image capture device (e.g., change image capture device settings) to specify how the image capture device should operate differently based on whether and/or how the lens cover(s) are being used with respect to the optical element(s) of the image capture device. The change in operation of the image capture device based on whether and/or how the lens cover(s) are being used with respect to the optical element(s) of the image capture device may be set based on default (e.g., default image capture device settings), based on context in which the image capture device is being used (e.g., based on time, location, setting), and/or other information.

In some implementations, the operation of the image capture device may be changed based on the state(s) of the usage of the lens cover(s) with respect to the optical element(s) such that responsive to the lens cover(s) being on the optical element(s), the image capture device is deactivated. Deactivation of the image capture device may refer to making the image capture device inactive. For example, deactivation of the image capture device may include turning off the image capture device, putting the image capture device in a stand-by/low power mode, and/or other deactivation of the image capture device. For example, referring to FIG. 4A, responsive to the lens cover 422 being on the optical element 412/being placed on the optical element 412, the image capture device 402 may be automatically turned off or placed into a stand-by mode. Responsive to the lens cover 422 being taken off the optical element 412, the image capture device 402 may be activated (e.g., exit standby mode).

In some implementations, the type of deactivation may depend on the extent to which the lens cover is on the optical element. For example, responsive to the lens cover being partially positioned on the optical element (e.g., shown in FIG. 5B), the image capture device may be put into a stand-by/low power mode. Responsive to the lens cover being fully positioned on the optical element (e.g., shown in FIG. 5C), the image capture device may be turned off.

In some implementations, the operation of the image capture device may be changed based on the state of the usage of a lens cover with respect to an optical element such that responsive to the lens cover being on the optical element, the corresponding image sensor is deactivated. Deactivation of the image sensor may refer to making the image sensor inactive. For example, deactivation of the image sensor may include turning off the image sensor, putting the image sensor in a stand-by/low power mode, and/or other deactivation of the image sensor. For example, referring to FIG. 4B, responsive to the lens cover 472 being on the optical element 462/being placed on the optical element 462, the image sensor for the optical element 462 (e.g., the image sensor to which the optical element 462 guides light) may be automatically turned off or placed into a stand-by mode. Responsive to the lens cover 472 being taken off the optical element 462, the corresponding image sensor may be activated (e.g., exit standby mode, power on). Such change in operation of the image capture device 452 may enable different optical elements/image sensors of a spherical image capture device to be turned on/off/used based whether or not the lens cover is on/off the optical elements.

In some implementations, the operation of the image capture device may be changed based on the state(s) of the usage of the lens cover(s) with respect to the optical element(s) such that responsive to the lens cover(s) being off the optical element(s), one or more alerts to place the lens cover(s) on the optical element(s) may be generated based on deactivation of the image capture device and/or other information. For example, a user may attempt to turn off the image capture device 402 and/or put the image capture device 402 into a stand-by mode without putting on the lens cover 422 on the optical element 412. In response, alert(s) may be generated to instruct/warn the user to place the lens cover 422 on the optical element 412. As another example, a user may attempt to turn off the image capture device 452 and/or put the image capture device 452 into a stand-by mode without putting on the lens cover 472 on the optical element 462 and/or the lens cover 474 on the optical element 464. In response, alert(s) may be generated to instruct/warn the user to place the lens cover 472 on the optical element 462 and/or the lens cover 474 on the optical element 464. The alert(s) may be generated visually (e.g., message on a display to put on the lens cover, blinking light), audibly (e.g., audible instruction to put on the lens cover, beeping), haptically (e.g., vibration), and/or through other user observable means.

In some implementations, the operation of the image capture device may be changed based on the state(s) of the usage of the lens cover(s) with respect to the optical element(s) such that the lens cover(s) are required to be on the optical element(s) to deactivate the image capture device. The image capture device may be prevented from being deactivated while the lens cover(s) are not on the optical element(s). For example, the image capture device 402 may be prevented from being turned off and/or entering into a stand-by mode while the lens cover 422 is not on the optical element 412. The image capture device 452 may be prevented from being turned off and/or entering into a stand-by mode while the lens cover 472 is not on the optical element 462 and/or the lens cover 474 is not on the optical element 464. The image capture device may be deactivated once the lens cover(s) are placed on the optical element(s). For instance, a user may be given a duration of time after attempting to deactivate the image capture device to put the lens cover(s) on the optical element(s). Responsive to the lens cover(s) being put on the optical element(s) within the duration of time, the image capture device may be automatically deactivated.

In some implementations, the operation of the image capture device may be changed based on the state(s) of the usage of the lens cover(s) with respect to the optical element(s) such that responsive to the lens cover(s) being on the optical element(s) during activation of the image capture device, the image capture device is returned to prior deactivated state. Activation of the image capture device may refer to making the image capture device active. For example, activation of the image capture device active may include turning on the image capture device active, exiting from a stand-by/low power mode, and/or other activation of the image capture device. For instance, activation of the image capture device may include turning on the image capture device based on user engagement with a power button and/or a record button (e.g., the image capture device starting to record when turned on). Based on the lens cover(s) being on the optical element(s) when the image capture device is activated, the image capture device may return to the prior deactivated state. If the image capture device was turned off before being activated, the image capture device would automatically turn off responsive to the lens cover(s) being on the optical element(s). If the image capture device was in the stand-by mode/low power mode before being activated, the image capture device would automatically return to stand-by mode/low power mode. Such automatic change in activation/deactivation state of the image capture device may protect against unintentional and/or accidental engaged with the power/record button. Such automatically change in activation/deactivation state of the image capture device may suppress the necessity of requiring lengthy engagement with button(s) of the image capture device to activate the image capture device (e.g., requiring the power button be held for a number of seconds before turning on the image capture device).

In some implementations, the operation of the image capture device may be changed based on the state of the usage of a lens cover with respect to an optical element such that the lens cover is required to be off the optical element to activate the image capture device. The image capture device may be prevented from being activated (e.g., turned on, turn-on and start recording) while the lens cover(s) are on the optical element(s). For example, the image capture device 402 may be prevented from being turned on and/or exiting from a stand-by mode while the lens cover 422 is on the optical element 412. The image capture device 452 may be prevented from being turned on and/or exiting from a stand-by mode while the lens cover 472 is on the optical element 462 and the lens cover 474 is not on the optical element 464 (e.g., requiring at least one optical element of the spherical image capture device to be uncovered/unprotected for the spherical image capture device to be turned on). The image capture device may be activated once the lens cover(s) are taken off the optical element(s). For instance, a user may be given a duration of time after attempting to activate the image capture device to take the lens cover(s) off the optical element(s). Responsive to the lens cover(s) being taking off the optical element(s) within the duration of time, the image capture device may be automatically activated. Such prevention of the activation of the image capture device may suppress the necessity of requiring lengthy engagement with button(s) of the image capture device to activate the image capture device (e.g., requiring the power button be held for a number of seconds before turning on the image capture device).

In some implementations, the operation of the image capture device may be changed based on the state of the usage of the lens cover(s) with respect to the optical element(s) such that different user interactions with the camera required are to prompt the image capture device to perform one or more functions based on whether the lens cover(s) are on or off the optical element(s). For example, prompting the image capture device to perform a particular function may require different user interaction with the camera (e.g., user of different buttons, different engagement with buttons) based on whether the lens cover(s) are on or off the optical element(s). For instance, while the lens cover(s) are on the optical element(s), the user may be required to engage a button in a particular way to use a functionality of the image capture device. While the lens cover(s) are off the optical element(s), the user may be required to engage the button in a different way (e.g., change from requiring a click of the button to holding the button, change from requiring a single click to a double click) and/or engage a different button to use the same functionality of the image capture device.

For example, the function(s) may include switching between activation and deactivation (e.g., turning on and off, entering into and exiting out of stand-by mode/low-power mode), and the operation of the image capture device may be changed based on the state of the usage of lens cover(s) with respect to optical element(s). For instance, for an activation function (e.g., turning on, exiting out of stand-by mode/low-power mode), a long-press of a power/record button may be required to activate the image capture device responsive to the lens cover(s) being on the optical element(s). Responsive to the lens cover(s) being off the optical element(s) (e.g., at least one lens cover being off, all lens covers being off), a short-press of a power/record button may be required to activate the image capture device;

For a deactivation function (e.g., turning off, entering into stand-by mode/low-power mode): a short-press of a power button may be required to deactivate the image capture device responsive to the lens cover(s) being on the optical element(s). Responsive to the lens cover(s) being off the optical element(s) (e.g., at least one lens cover being off, all lens covers being off), a long-press of a power button may be required to deactivate the image capture device. Other user interactions and other functions of the image capture device are contemplated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
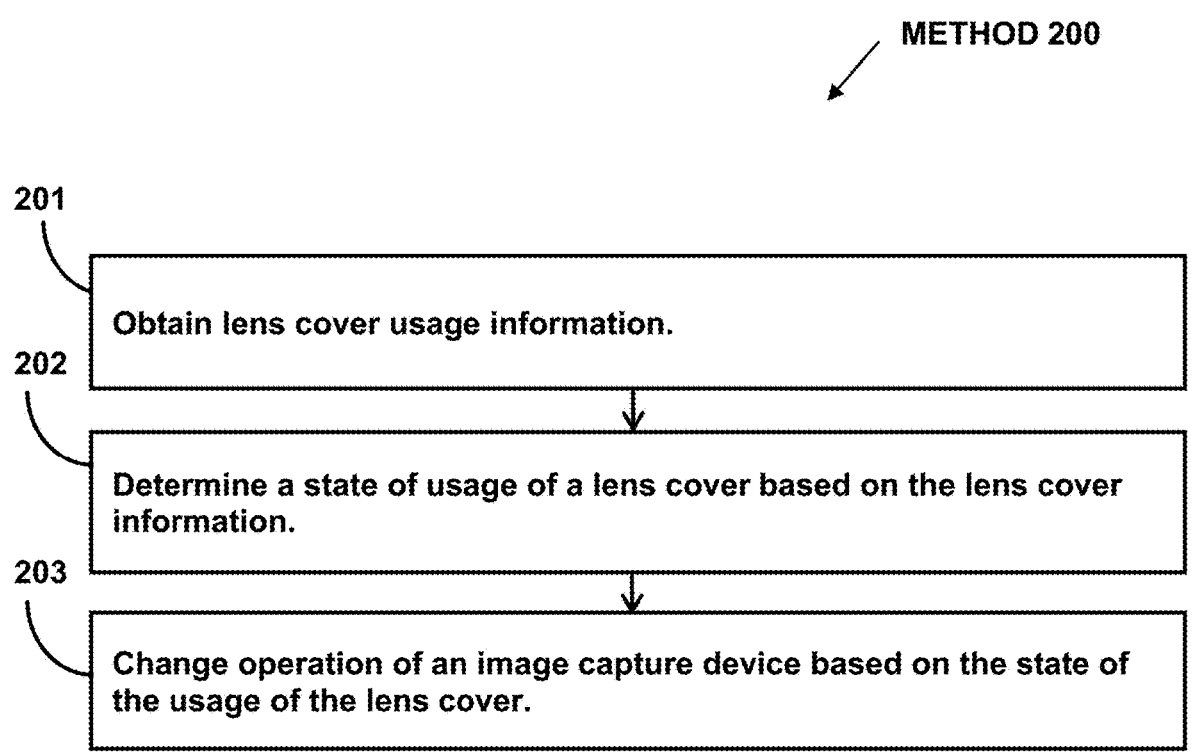
FIG. 2 illustrates an example method for changing image capture device operation based on lens cover usage.

FIG. 2 illustrates method 200 for changing image capture device operation based on lens cover usage. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 201, lens cover usage information and/or other information may be obtained. The lens cover usage information may characterize usage of a lens cover with respect to an optical element. In some implementation, operation 201 may be performed by a processor component the same as or similar to the lens cover usage information component 102 (Shown in FIG. 1 and described herein).

At operation 202, a state of the usage of the lens cover with respect to the optical element may be determined based on the lens cover usage information and/or other information. In some implementation, operation 202 may be performed by a processor component the same as or similar to the lens cover usage component 104 (Shown in FIG. 1 and described herein).

At operation 203, operation of an image capture device may be changed based on the state of the usage of the lens cover with respect to the optical element and/or other information. In some implementation, operation 203 may be performed by a processor component the same as or similar to the operation component 106 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. An image capture device for changing operation based on lens cover usage, the image capture device comprising:
    a housing;
    an optical element carried by the housing and configured to guide light within a field of view to an image sensor;
    the image sensor carried by the housing and configured to generate a visual output signal conveying visual information based on light that becomes incident thereon, the visual information defining visual content having the field of view; and
    one or more physical processors configured by machine-readable instructions to:
        obtain lens cover usage information, the lens cover usage information characterizing usage of a lens cover with respect to the optical element;
        determine a state of the usage of the lens cover with respect to the optical element based on the lens cover usage information; and
        change operation of the image capture device based on the state of the usage of the lens cover with respect to the optical element such that the image capture device responds differently to user interaction with the image capture device based on different states of the usage of the lens cover with respect to the optical element, wherein the image capture device responding differently to the user interaction with the image capture device based on the different states of the usage of the lens cover with respect to the optical element includes different user interactions with the image capture device being required to prompt the image capture device to perform a function based on whether the lens cover is on or off the optical element.

2. The image capture device of claim 1, wherein the operation of the image capture device is changed based on the state of the usage of the lens cover with respect to the optical element such that responsive to the lens cover being on the optical element, the image capture device is deactivated.

3. The image capture device of claim 1, wherein the operation of the image capture device is changed based on the state of the usage of the lens cover with respect to the optical element such that responsive to the lens cover being on the optical element, the image sensor is deactivated.

4. The image capture device of claim 1, wherein the operation of the image capture device is changed based on the state of the usage of the lens cover with respect to the optical element such that the lens cover is required to be on the optical element to deactivate the image capture device.

5. The image capture device of claim 1, wherein the operation of the image capture device is changed based on the state of the usage of the lens cover with respect to the optical element such that responsive to the lens cover being on the optical element during activation of the image capture device, the image capture device is returned to prior deactivated state.

6. The image capture device of claim 1, wherein the operation of the image capture device is changed based on the state of the usage of the lens cover with respect to the optical element such that the lens cover is required to be off the optical element to activate the image capture device.

7. The image capture device of claim 1, wherein the state of the usage of the lens cover with respect to the optical element is determined to be on, off, or between on and off.

8. The image capture device of claim 1, wherein the function includes switching between turning on and off, and the operation of the image capture device is changed based on the state of the usage of the lens cover with respect to the optical element such that for a turning on function:
responsive to the lens cover being on the optical element, a long-press of a power button is required to turn on the image capture device; and
responsive to the lens cover being off the optical element, a short-press of the power button is required to turn on the image capture device.

9. The image capture device of claim 1, wherein the function includes switching between turning on and off, and the operation of the image capture device is changed based on the state of the usage of the lens cover with respect to the optical element such that for a turning off function:
responsive to the lens cover being on the optical element, a short-press of the power button is required to turn off the image capture device; and
responsive to the lens cover being off the optical element, a long-press of the power button is required to turn off the image capture device.

10. A method for changing operation of an image capture device based on lens cover usage, the image capture device including an optical element, an image sensor, and one or more processors, the optical element configured to guide light within a field of view to the image sensor, the method comprising:

obtaining, by the one or more processors, lens cover usage information, the lens cover usage information characterizing usage of a lens cover with respect to the optical element;
determining, by the one or more processors, a state of the usage of the lens cover with respect to the optical element based on the lens cover usage information; and
changing, by the one or more processors, operation of the image capture device based on the state of the usage of the lens cover with respect to the optical element such that the image capture device responds differently to user interaction with the image capture device based on different states of the usage of the lens cover with respect to the optical element, wherein the image capture device responding differently to the user interaction with the image capture device based on the different states of the usage of the lens cover with respect to the optical element includes different user interactions with the image capture device being required to prompt the image capture device to perform a function based on whether the lens cover is on or off the optical element.

11. The method of claim 10, wherein the operation of the image capture device is changed based on the state of the usage of the lens cover with respect to the optical element such that responsive to the lens cover being on the optical element, the image capture device is deactivated.

12. The method of claim 10, wherein the operation of the image capture device is changed based on the state of the usage of the lens cover with respect to the optical element such that responsive to the lens cover being on the optical element, the image sensor is deactivated.

13. The method of claim 10, wherein the operation of the image capture device is changed based on the state of the usage of the lens cover with respect to the optical element such that the lens cover is required to be on the optical element to deactivate the image capture device.

14. The method of claim 10, wherein the operation of the image capture device is changed based on the state of the usage of the lens cover with respect to the optical element such that responsive to the lens cover being on the optical element during activation of the image capture device, the image capture device is returned to prior deactivated state.

15. The method of claim 10, wherein the operation of the image capture device is changed based on the state of the usage of the lens cover with respect to the optical element such that the lens cover is required to be off the optical element to activate the image capture device.

16. The method of claim 10, wherein the state of the usage of the lens cover with respect to the optical element is determined to be on, off, or between on and off.

17. The method of claim 10, wherein the function includes switching between turning on and off, and the operation of the image capture device is changed based on the state of the usage of the lens cover with respect to the optical element such that for a turning on function:
responsive to the lens cover being on the optical element, a long-press of a power button is required to turn on the image capture device; and
responsive to the lens cover being off the optical element, a short-press of the power button is required to turn on the image capture device.

18. The method of claim 10, wherein the function includes switching between turning on and off, and the operation of the image capture device is changed based on the state of the usage of the lens cover with respect to the optical element such that for a turning off function:

responsive to the lens cover being on the optical element, a short-press of the power button is required to turn off the image capture device; and responsive to the lens cover being off the optical element, a long-press of the power button is required to turn off the image capture device.

19. An image capture device for changing operation based on lens cover usage, the image capture device comprising:

a housing;

an optical element carried by the housing and configured to guide light within a field of view to an image sensor;

the image sensor carried by the housing and configured to generate a visual output signal conveying visual information based on light that becomes incident thereon, the visual information defining visual content having the field of view; and one or more physical processors configured by machine-readable instructions to:

obtain lens cover usage information, the lens cover usage information characterizing usage of a lens cover with respect to the optical element;

determine a state of the usage of the lens cover with respect to the optical element based on the lens cover usage information; and change operation of the image capture device based on the state of the usage of the lens cover with respect to the optical element such that the image capture device responds differently to user interaction with the image capture device based on different states of the usage of the lens cover with respect to the optical element, wherein the image capture device responding differently to the user interaction with the image capture device based on the different states of the usage of the lens cover with respect to the optical element includes different user interactions with the image capture device being required to prompt the image capture device to perform a function based on whether the lens cover is on or off the optical element;

wherein:

the function includes switching between turning on and off; and the operation of the image capture device is changed based on the state of the usage of the lens cover with respect to the optical element such that: for a turning on function:

responsive to the lens cover being on the optical element, a long-press of a power button is required to turn on the image capture device; and responsive to the lens cover being off the optical element, a short-press of the power button is required to turn on the image capture device; or the operation of the image capture device is changed based on the state of the usage of the lens cover with respect to the optical element such that for a turning off function:

responsive to the lens cover being on the optical element, the short-press of the power button is required to turn off the image capture device; and responsive to the lens cover being off the optical element, the long-press of the power button is required to turn off the image capture device.

20. The image capture device of claim 19, wherein the state of the usage of the lens cover with respect to the optical element is determined to be on, off, or between on and off.

* * * * *